United States Patent

Kadowaki et al.

Patent Number: 5,414,457
Date of Patent: May 9, 1995

[54] MULTI-MEDIA COMMUNICATION APPARATUS

[75] Inventors: Shuichi Kadowaki; Koji Takahashi, both of Yokohama, Japan

[73] Assignee: Canon Kabushiki Kaisha, Tokyo, Japan

[21] Appl. No.: 813,497

[22] Filed: Dec. 26, 1991

[30] Foreign Application Priority Data

Dec. 26, 1990 [JP] Japan .................................. 2-414469
Jan. 22, 1991 [JP] Japan .................................. 3-005705

[51] Int. Cl.6 ........................ H04M 11/00; H04N 7/14
[52] U.S. Cl. ........................................ 348/14; 379/96; 379/142; 379/355; 379/356; 379/357
[58] Field of Search ........................ 379/53, 96, 97, 98, 379/93, 142, 355, 356, 357; 358/85; 348/14, 15, 16, 17, 18, 19

[56] References Cited

U.S. PATENT DOCUMENTS

| | | | |
|---|---|---|---|
| 4,827,085 | 5/1989 | Janiv et al. | 379/96 |
| 4,870,677 | 9/1989 | Di Santo et al. | 379/96 |
| 4,885,580 | 12/1989 | Noto et al. | 379/96 |
| 4,943,994 | 7/1990 | Ohtsuka et al. | 379/53 |
| 5,018,186 | 5/1991 | Kimura et al. | 379/53 |
| 5,099,512 | 3/1992 | Shigami et al. | 379/100 |
| 5,119,414 | 6/1992 | Izumi | 379/216 |

FOREIGN PATENT DOCUMENTS

| | | | |
|---|---|---|---|
| 0436345 | 7/1991 | European Pat. Off. | 379/53 |
| 0106318 | 4/1984 | Germany . | |
| 0296438 | 12/1988 | Japan | 379/216 |
| 0212056 | 8/1989 | Japan | 379/53 |
| 0113657 | 4/1990 | Japan | 379/53 |
| 2158250 | 6/1990 | Japan | H04N 1/274 |
| 0305256 | 12/1990 | Japan | 379/53 |
| 0174856 | 7/1991 | Japan | 379/216 |
| 0191648 | 7/1991 | Japan | 379/53 |

*Primary Examiner*—Curtis Kuntz
*Assistant Examiner*—Stella L. Woo
*Attorney, Agent, or Firm*—Fitzpatrick, Cella, Harper & Scinto

[57] ABSTRACT

A communication apparatus includes a storage unit for storing image information associated with a distant station, an instruction unit for instructing a read operation of image information stored in the storage unit, a display unit for reading out and displaying a plurality of pieces of image information instructed by the instruction unit, and a communication control unit for generating a call to one of distant stations corresponding to the pieces of image information displayed on the display unit.

6 Claims, 19 Drawing Sheets

MULTI-MEDIA COMMUNICATION APPARATUS

BACKGROUND OF THE INVENTION

1. Field of the Invention

The present invention relates to a multi-media communication apparatus for transmitting an image signal and a voice signal through a communication line.

2. Related Background Art

Conventionally, multi-media communication apparatuses capable of performing speech and image communications are known. The present applicant has filed, as inventions associated with multi-media communications, U.S. patent application Ser. No. 628,178, U.S. patent application Ser. No. 668,897, U.S. Patent Application based on Japanese Patent Application Nos. 2-236848 and 3-128360, U.S. patent application Ser. No. 758,697, and U.S. Patent Application based on Japanese Patent Application Nos. 2-251195 and 2-414513.

FIG. 21 is a block diagram showing an arrangement of a conventional telephone set with a telephone number memory. In this telephone set, telephone numbers registered using ten keys 210 are stored in a telephone number memory 230 in units of registration numbers (e.g., 1 to 20) through a memory control unit 220. When a telephone call is to be made to a given party, the corresponding registration number is input using the ten keys 210. In response to this operation, the memory control unit 220 reads out a telephone number corresponding to the input registration number, and a dial control circuit 240 performs a dial operation based on the readout telephone number. In this manner, the given party can be accessed through a telephone line 25.

When a user wants to make a telephone call by inputting a registration number using the above-mentioned telephone set, an unintended wrong number may be called since the calling operation relies only on the registration number. When the user forgets a registration number of a telephone number of a party to be called, he or she cannot call the telephone number.

In a conventional multi-media communication apparatus, a device for, when calling is to be performed to a given party to be communicated, automatically calling a corresponding telephone number upon depression of a key corresponding to a name and number of the party, is known.

In the conventional multi-media communication apparatus, a user can watch an image of a given person only after the person responds to a call after calling, and hence, cannot visually recognize the person's image before calling. It is often easier to specify a person by watching his or her image than to do so by observing his or her name. In this case, it is a problem that the person's image cannot be visually recognized before calling.

SUMMARY OF THE INVENTION

It is an object of the present invention to provide a communication apparatus, which can eliminate conventional drawbacks, and can visually observe an image of a given party to be called before calling.

It is another object of the present invention to provide a communication apparatus, which can connect a speech channel after a user confirms a party to be called by, e.g., watching a displayed face photograph.

It is still another object of the present invention to provide a communication apparatus, which can connect a communication channel after a telephone number of a party to be called, and information associated therewith are displayed.

It is still another object of the present invention to provide a communication apparatus, which can reliably perform a calling operation to a party to be communicated by a simple arrangement.

It is still another object of the present invention to provide a communication apparatus, which can perform a calling operation using image information sent from a party to be called.

It is still another object of the present invention to provide a communication apparatus, which can perform a calling operation using an IC card.

The above and other objects of the present invention will be apparent from the accompanying drawings, and the detailed description taken in conjunction with the accompanying drawings.

DETAILED DESCRIPTION OF THE PREFERRED EMBODIMENTS

<First Embodiment>

Figure 3:
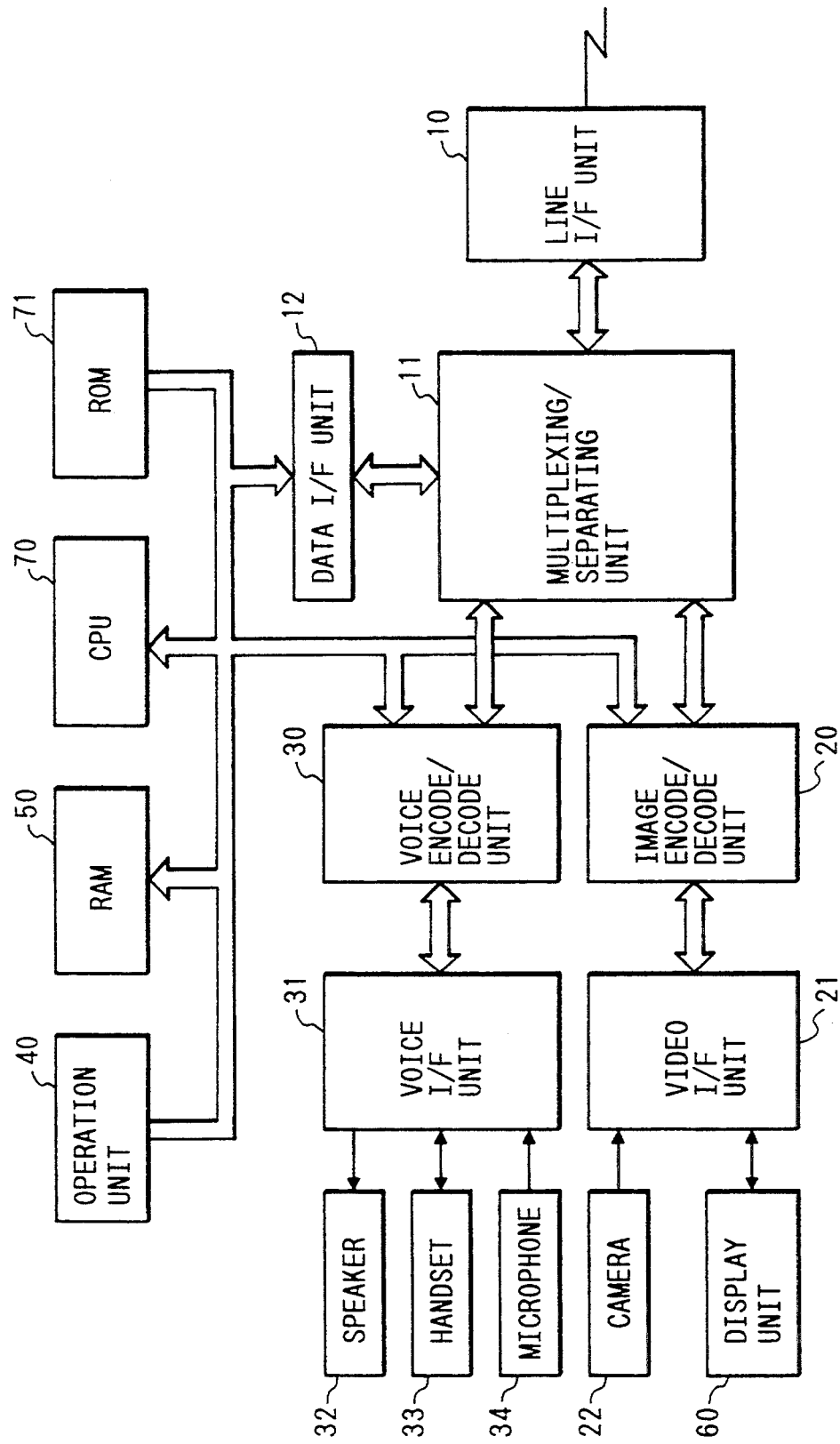
FIG. 3 is a block diagram showing the arrangement of the communication apparatus according to the first embodiment of the present invention.
Figure 4:
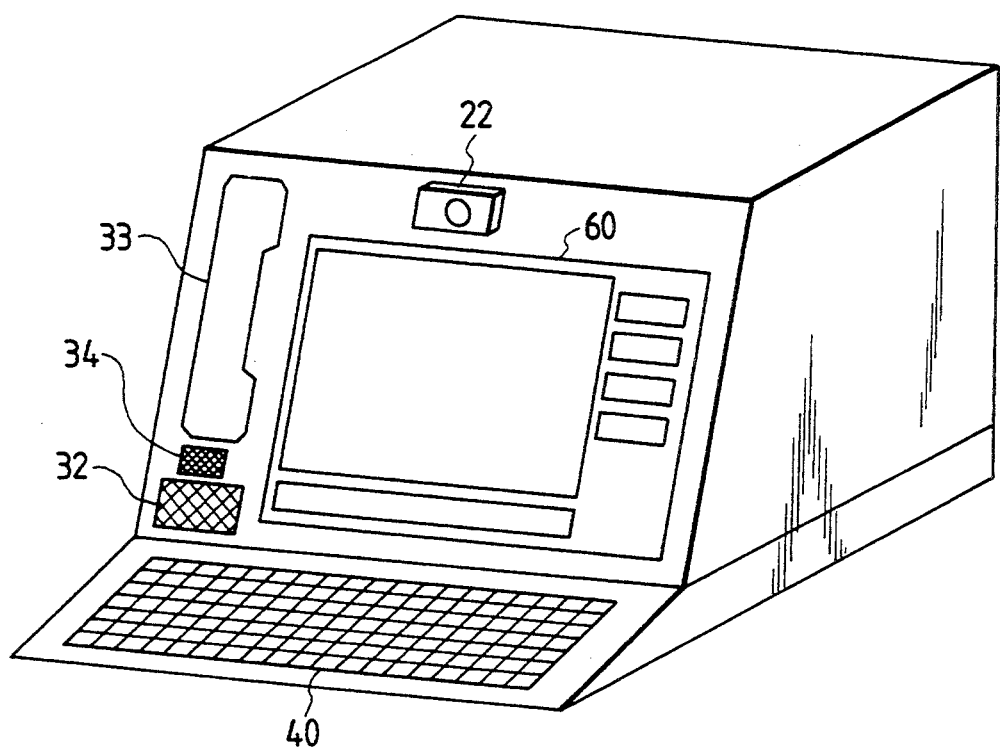
FIG. 4 is a perspective view of the communication apparatus according to the first embodiment of the present invention.

FIG. 3 is a block diagram showing the arrangement of a multi-media communication apparatus according to the first embodiment of the present invention. FIG. 4 is a perspective view of the multi-media communication apparatus.

In FIG. 3, a multiplexing/separating unit 11 separates a signal received by a line I/F (interface) unit 10, and multiplexes an image signal and a voice signal to be transmitted to a given party. A data I/F (interface) unit 12 exchanges data signals associated with connection control of a line.

An image encode/decode unit 20 decodes an image signal separated by the multiplexing/separating unit 11, and encodes an image signal to be transmitted to a given party. A video I/F (interface) unit 21 exchanges image signals.

A voice encode/decode unit 30 decodes a voice signal separated by the multiplexing/separating unit 11, and encodes a voice signal to be transmitted to a given party. A voice I/F (interface) unit 31 exchanges voice signals.

An operation unit 40 comprises a keyboard, and touch sensors. A RAM 50 is a memory for storing an image signal decoded by the image decode/encode unit 20. A display unit 60 displays an image according to an image signal received by the video I/F unit 21. A CPU 70 controls the respective units of the apparatus of this embodiment. A ROM 71 is a memory for storing a program for operating the CPU 70.

In addition, the multi-media communication apparatus comprises a camera 22, a speaker 32, a handset 33, and a microphone 34.

The operation unit 40 comprises a registration start touch sensor 41, a registration end touch sensor 42, a registered party display touch sensor 43, and an image plane renewal touch sensor 44 (FIG. 1) arranged on the display unit 60.

The registration start touch sensor 41 is a touch sensor touched when a registration operation of a received image, and a selection signal for a telephone number of a calling party is started. The registration end touch sensor 42 is a touch sensor touched when the registration operation of the received image and the selection signal for the telephone number of the calling party is ended.

The registered party display touch sensor 43 is a touch sensor touched when an image according to an image signal stored in the RAM 50, and the telephone number of the calling party are displayed on the display unit 60. The image plane renewal touch sensor 44 is a touch sensor touched when the image plane of an image display unit 61 is renewed.

The RAM 50 also functions as a memory for storing a selection signal for the telephone number of the calling party in correspondence with a received image. The registration start touch sensor 41, the registration end touch sensor 42, and the RAM 50 are an example of registration means for registering an image signal received from a given party, and a selection signal for a telephone number of the party received from the party in correspondence with each other.

Figure 1:
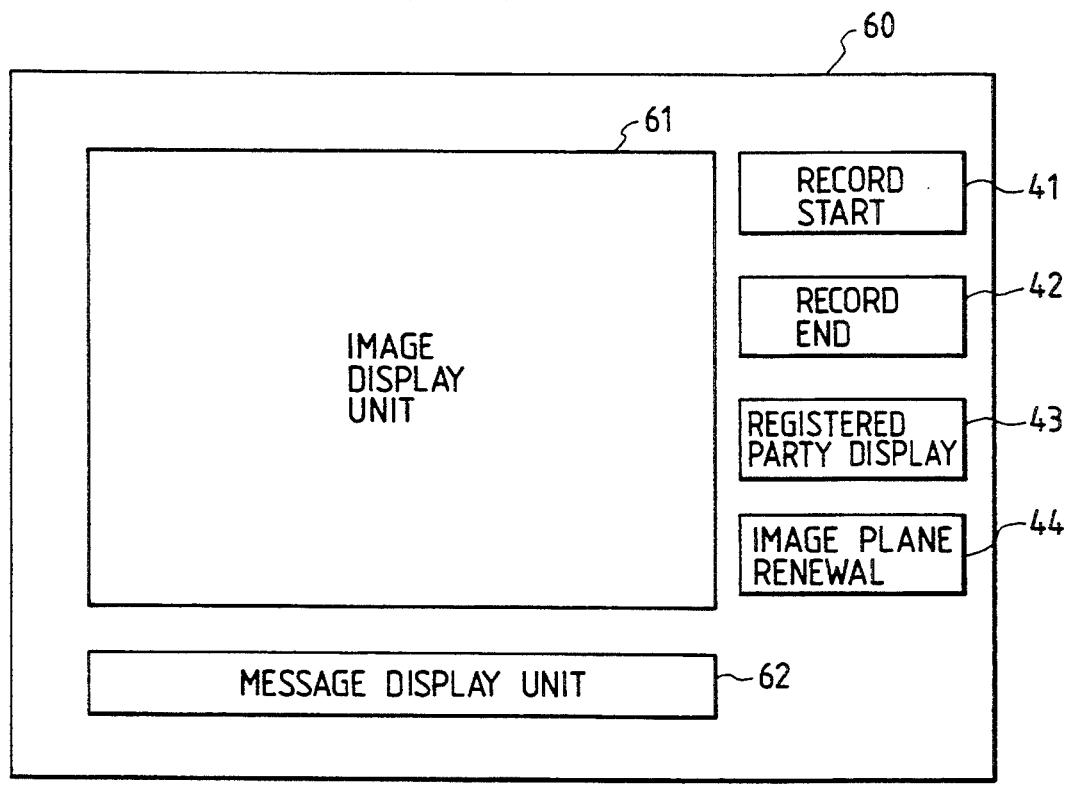
FIGS. 1 and 2 are views showing in detail a display unit of a communication apparatus according to the first embodiment of the present invention.

FIG. 1 is a front view showing in detail the display unit 60 of the first embodiment.

Figure 2:
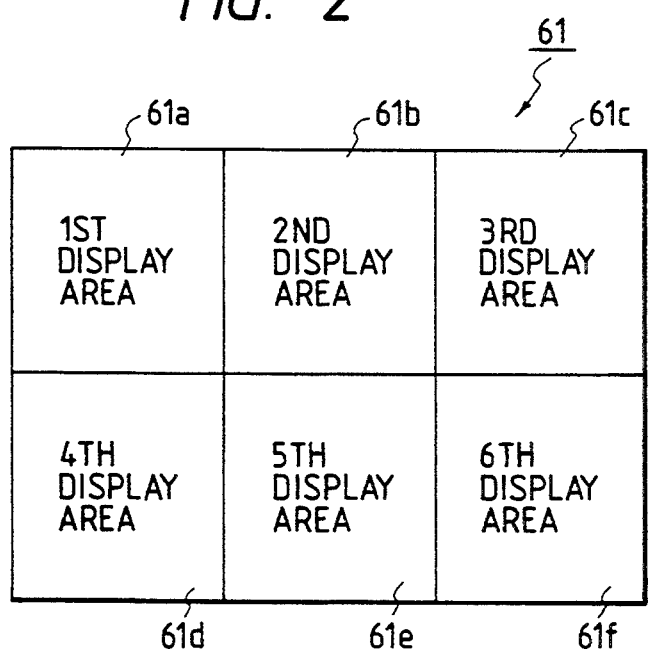

The display unit 60 has the image display section 61 for displaying a received image, and a message display section 62 for displaying a message such as an error message. The image display section 61 is equally divided into six areas, i.e., a first display area 61a, a second display area 61b, a third display area 61c, . . . , a sixth display area 61f, as shown in FIG. 2, and these display areas respectively serve as touch areas of the touch sensors. The registered party display touch sensor 43 and the image display section 61 constitute display means for displaying images according to registered image signals, and telephone numbers according to registered selection signals. The display areas 61a, 61b, 61c, 61d, 61e, and 61f respectively display images registered in the RAM 50. When an operator touches one of these display areas, he or she can designate a telephone number of a party to be called. Thus, these display areas constitute designation means for, when an image displayed on the display means is designated, designating a telephone number of a party to be called.

The CPU 70 checks if the touch sensor 41, 42, 43, or 44 is touched, and checks, in a reception state upon detection of a calling signal from a party, if a response is made to an incoming call. When one of the display areas of the image display section 61 is touched, the CPU 70 serves to call a telephone number corresponding to an image displayed on the touched display area. The image display section 61 and the CPU 70 constitute selection signal output means for outputting a selection signal for a designated telephone number.

Figure 5:
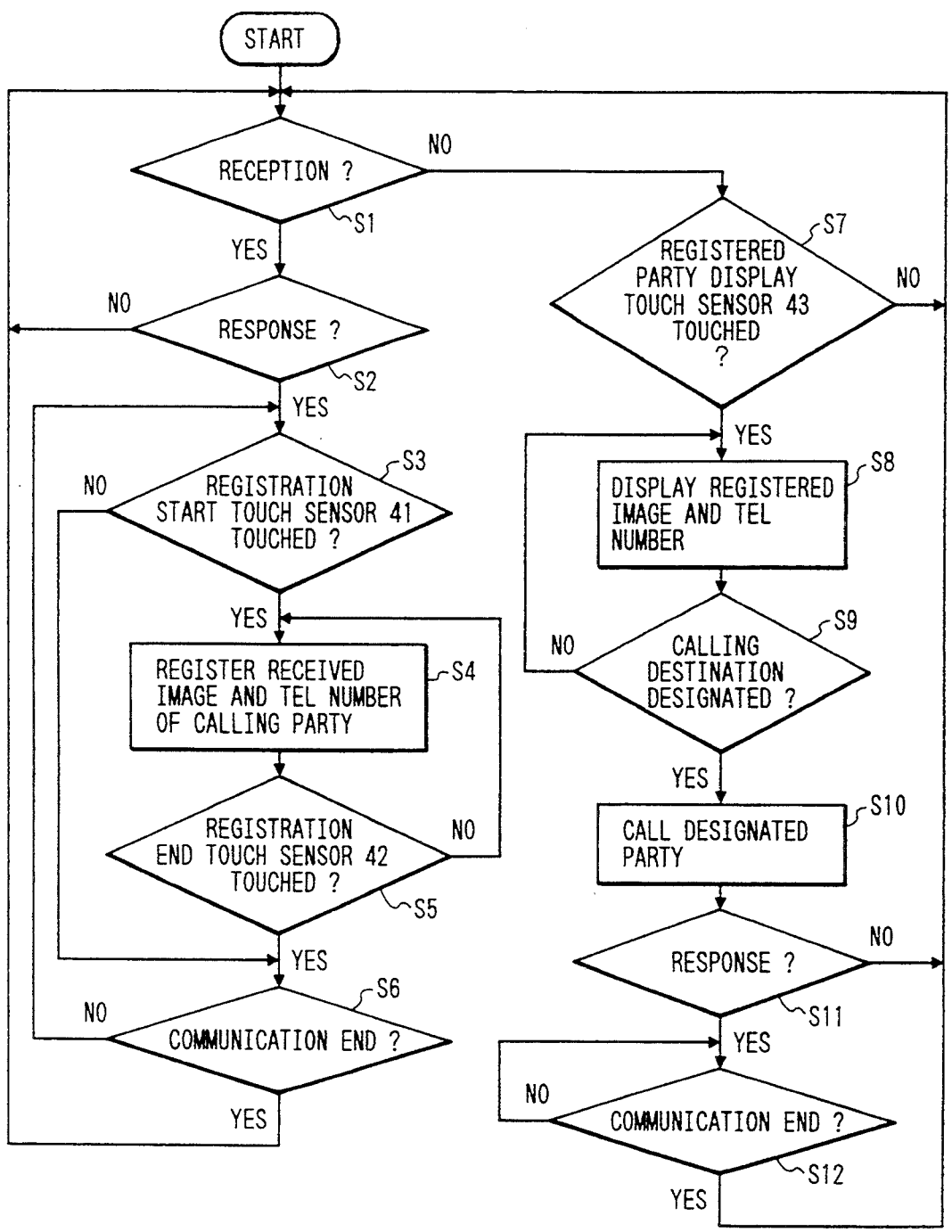
FIG. 5 is a flow chart showing an operation of the first embodiment.

The operation of the first embodiment will be described below. FIG. 5 is a flow chart showing the operation of the first embodiment.

In the multi-media communication apparatus, when an incoming call is received (S1), and a response to the incoming call is made (S2), the CPU 70 checks if the registration start touch sensor 41 is touched (S3). If the CPU 70 determines that the registration start touch sensor 41 is touched (S3), a received image signal, and a selection signal for a telephone number of a calling party are registered in the RAM 50 in correspondence with each other (S4). More specifically, the multiplexing/separating unit 11 separates a signal received by the line I/F unit 10, and the image encode/decode unit 20 encodes the separated image signal. The CPU 70 stores the decoded image signal in the RAM 50. On the other hand, a selection signal for a telephone number of a calling party received by the data I/F unit 12 is stored in the RAM 50 in correspondence with the received image signal. Thereafter, the registered image is displayed on the image display section 61. An operator selects an image to make a telephone call to a calling party of the image using a telephone number corresponding to the image.

In order to end the registration operation of the received image and the selection signal for a telephone number of a calling party, an operator can touch the registration end touch sensor 42. If the CPU 70 determines that the registration end touch sensor 42 is touched (S5), the registration operation of the received image and the selection signal for a telephone number of a calling party is ended.

When a calling operation to a registered party is to be performed upon completion of a communication (S6), an operator touches the registered party display touch sensor 43, and designates an image of a party to be called from the images displayed on the image display section 61. More specifically, if the CPU 70 determines that the registered party display touch sensor 43 is touched (S7), tops of images stored in the RAM 50, and corresponding telephone numbers of calling parties are displayed in the order of registration in the first display area 61a, the second display area 61b, the third display area 61c, . . . , the sixth display area 61f (S8). At this time, if the CPU 70 determines that the image plane renewal touch sensor 55 is touched, the image plane of the image display section 61 is renewed.

When seven pairs of image signals and telephone numbers of calling parties are stored in the RAM 50, after an operator touches the registered party display touch sensor 43, the first six pairs of images and telephone numbers are displayed in turn from the first display area 61a to the sixth display area 61f. After the operator touches the image plane renewal touch sensor 44, the image plane of the image display section 61 is renewed to erase the first pair of the image and the telephone number displayed on the first display area 61a, and to display the seventh pair of the image and the telephone number on the first display area 61a. The second to sixth pairs of images and telephone numbers are displayed without being erased.

After the tops of images registered in the RAM 50, and corresponding telephone numbers are displayed on the image display section 61, an operator touches one of the display areas on the image display section 61 so as to designate a calling destination (S9). The CPU 70 outputs a selection signal for a telephone number corresponding to the image displayed on the touched display area (S10).

As described above, in a reception state, an image of a calling party and a selection signal for a telephone number are registered in the RAM 50 in correspondence with each other, and the registered image is displayed on the image display section 61. When a calling operation is performed to a party corresponding to the registered image, an operator need only designate the image of the party to be called from displayed images, and the CPU 70 automatically outputs a selection Signal for a telephone number corresponding to the designated image. Therefore, the image of a party to be called can be visually recognized before calling. Thus, since calling can be made after confirmation of an image such as a face of a party to be called, a dialing error can be prevented.

Note that a key for designating images displayed on the first to sixth display areas 61a to 61f of the image display section 61 may be arranged.

When a plurality of images are designated from the images displayed on the image display section 61, the CPU 70 may automatically and sequentially output selection signals for a plurality of designated parties.

Furthermore, the present invention is not limited to a registration operation of an image of a calling party in a reception state. For example, a calling operation may be made to a party who is not registered in the RAM 50, and when the party responds, his or her image and a selection signal for his or her telephone number may be stored in the RAM 50 in correspondence with each other.

In this manner, according to the first embodiment of the present invention, an image of a party to be called can be visually recognized before calling, and a calling operation can be reliably performed to a required party with a simple operation.

Other examples for confirming an image associated with a party to be communicated before calling will be described hereinafter as the second to fifth embodiments.

<Second Embodiment>

Figure 6:
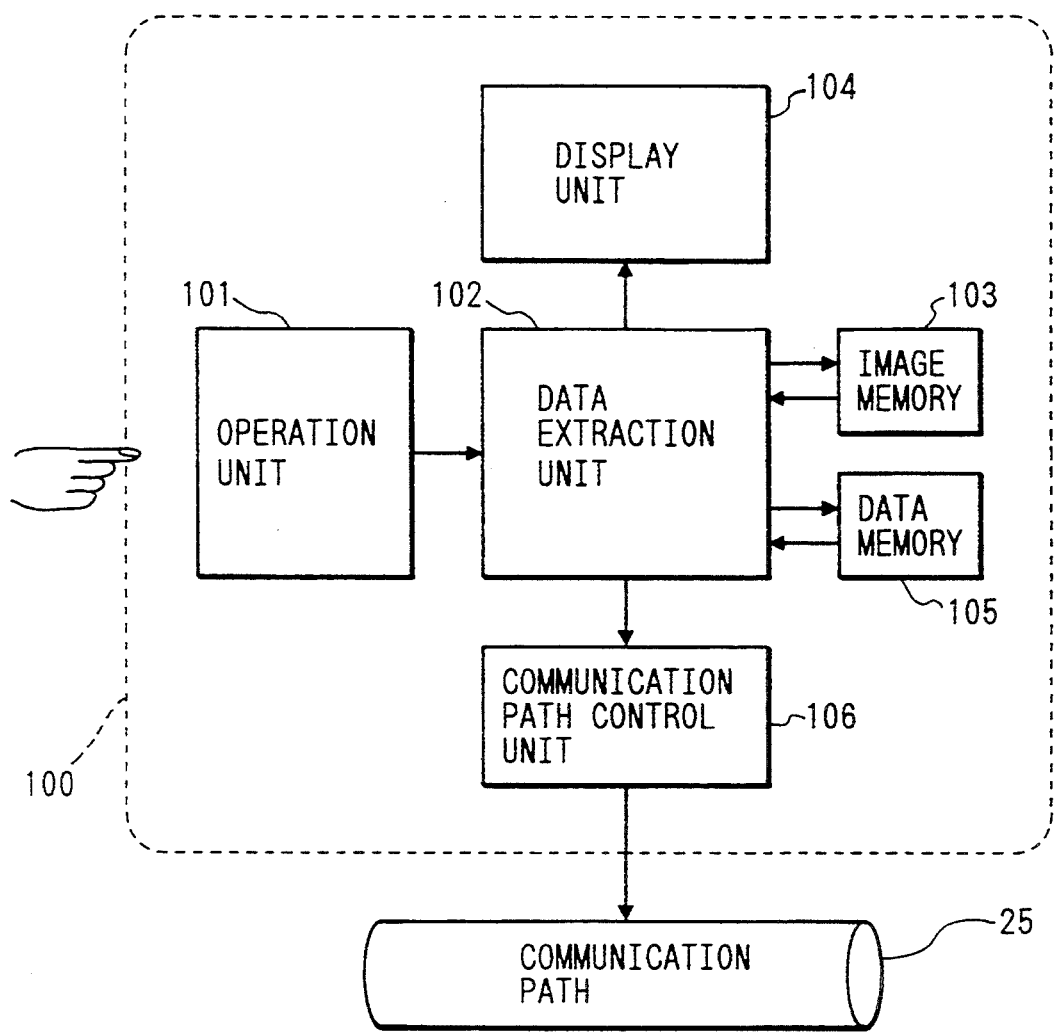
FIG. 6 is a schematic block diagram showing a telephone set according to the second embodiment of the present invention.

FIG. 6 is a block diagram showing the arrangement of a telephone set according to the second embodiment of the present invention.

In FIG. 6, a telephone set main body 100 of the second embodiment includes an operation unit 101 comprising ten keys. A data extraction unit 102 reads out corresponding image data from an image memory 103 or reads out, e.g., a corresponding telephone number from a data memory 105 in response to an instruction from the operation unit 101. Furthermore, the data extraction unit 102 outputs the readout image data to a display unit 104, and causes it to display an image. In addition, the unit 102 can cause a communication path control unit 106 to make a call on a communication path 25 according to the telephone number read out from the data memory 105.

Figure 7:
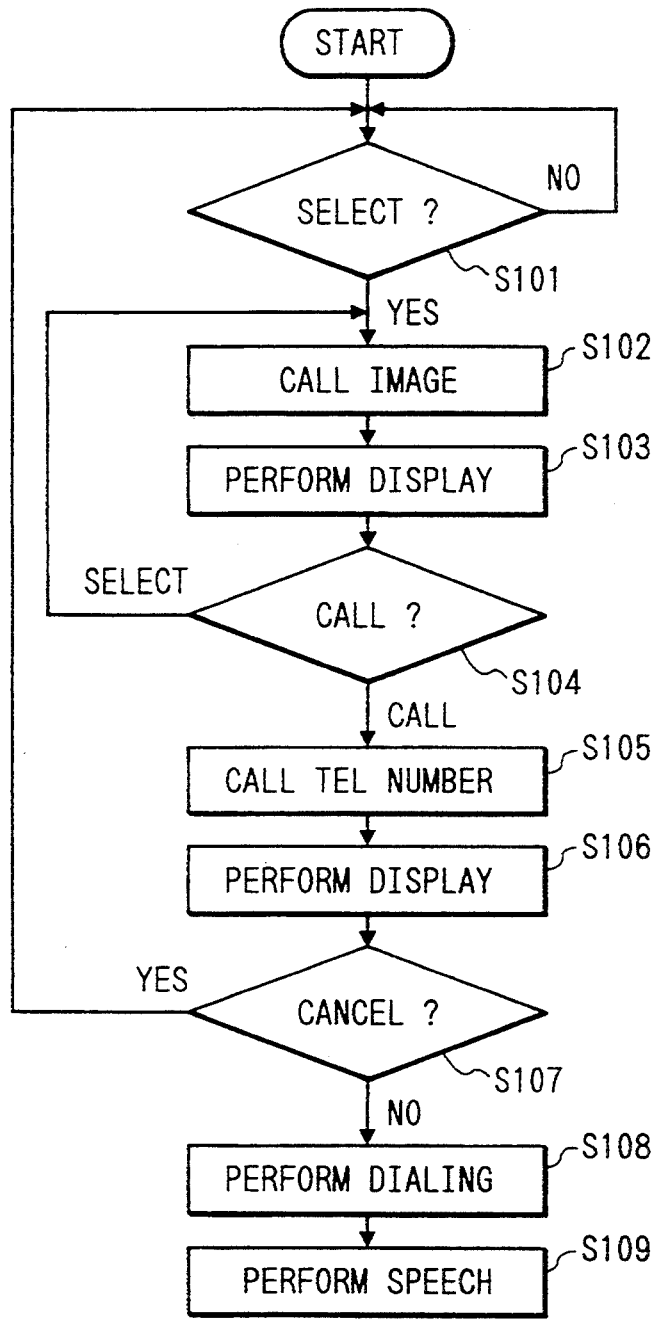
FIG. 7 is a flow chart showing a control operation of the telephone set according to the second embodiment of the present invention.

FIG. 7 is a flow chart showing a control operation of the data extraction unit 102. The operation of the data extraction unit 102 will be described below with reference to this flow chart. Note that the data extraction unit 102 comprises a CPU for controlling the telephone set 100, a ROM storing a program, and a RAM used as a work area.

It is checked in step S101 if a select button of the operation unit 101 is depressed. If YES in step S101, the flow advances to step S102, and image data is read out from the image memory 103. In step S103, the readout image data is displayed on the display unit 104. The image memory 103 stores image data such as face photographs of persons whose telephone numbers are registered. These image data are sequentially read out and displayed on the display unit 104 upon depression of the select button.

When an image of a desired party is displayed on the display unit 104 in this manner, a call switch or button is depressed, and the flow advances from step S104 to step S105. However, when the displayed image is not a party to be communicated, the select button is depressed again, and the flow returns to step S102. This operation is repeated until the image of a desired party is displayed.

In step S105, upon depression of the call button of the operation unit 101, a telephone number registered in association with the displayed image data is read out from the data memory 105. In step S106, the readout telephone number is displayed on the display unit 104. In step S107, an operator checks the displayed number. If the displayed number is wrong, the operator depresses a cancel button, and the flow returns to step S101, thus repeating the above-mentioned processing. If it is determined in step S107 that the cancel button is not depressed, the flow advances to step S108, and a dialing control operation for making a call based on the readout telephone number is started. When the call is established, the flow advances to step S109, and a speech communication using the telephone set is performed.

Note that the image memory 103 may comprise a semiconductor memory, a still video (SV) floppy, or a VTR. When the SV floppy is employed, telephone numbers may be written in control tracks, or may be stored as ID words.

The display unit 104 may be commonly used as a display unit (e.g., a color LCD) of a TV telephone set, or may be a very compact color LCD.

<Third Embodiment>

The third embodiment of the present invention will be described below with reference to FIGS. 8 and 9.

Figure 8:
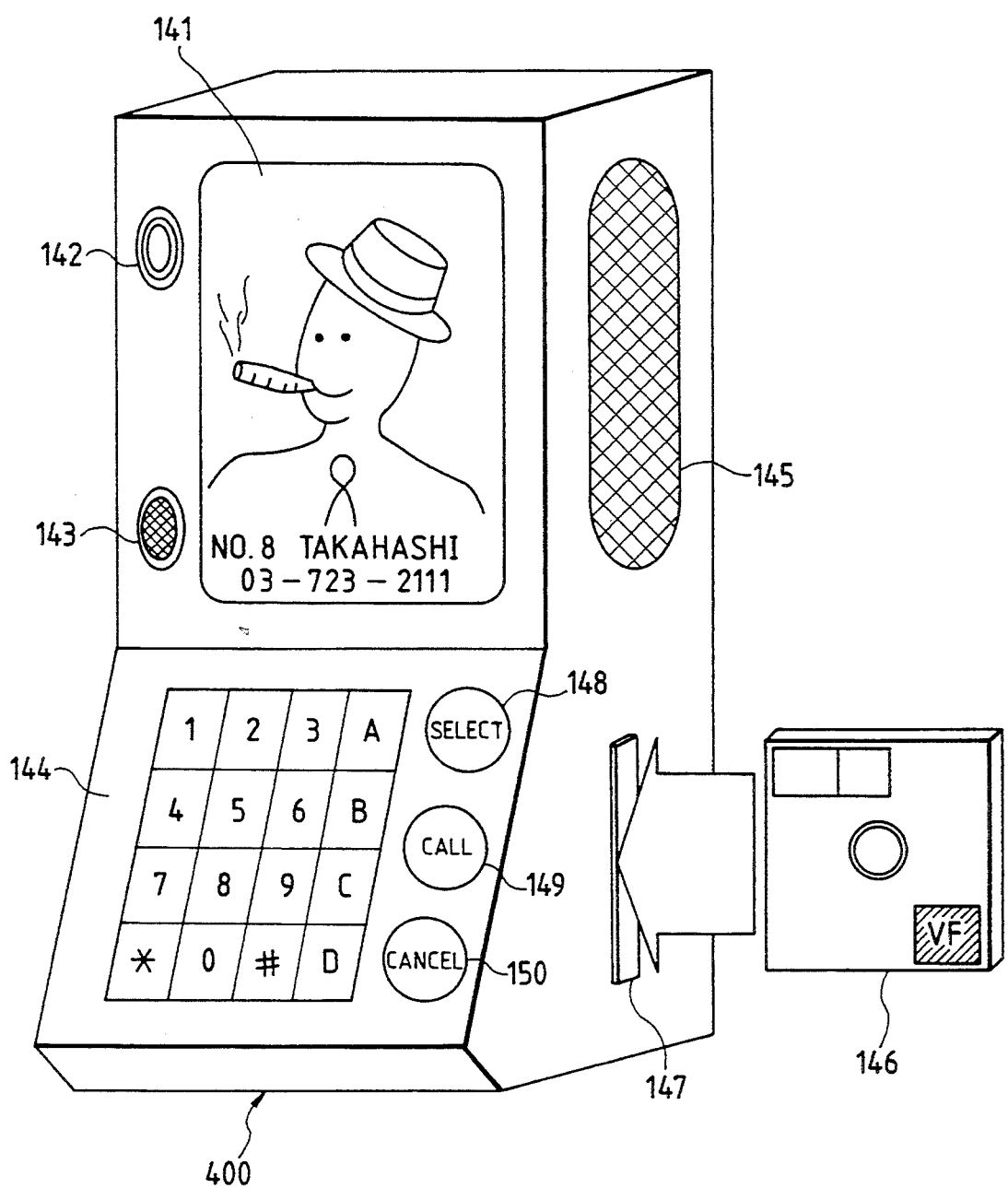
FIG. 8 is a perspective view showing the outer appearance of a telephone set according to the third embodiment of the present invention.

FIG. 8 shows the outer appearance of a TV (television) telephone set 400 as a multi-media communication apparatus. On a cabinet (main body) of the telephone set, a microphone 143 necessary for a communication, and a speaker 145 for outputting a voice of a communicating party are arranged through a voice processing circuit 152 (FIG. 9) as a hand-free type howling prevention circuit. An LCD color monitor 141 and a camera 142 are also arranged on the cabinet. Thus, an operator can be photographed, and the obtained image data can be transmitted to a distant station. An operation panel 144 is provided with a select button 148, a call button 149, a cancel button 150, a registration dial switch, ten keys for inputting, e.g., a telephone number, and the like. An SV floppy 146 serves as an image memory, and stores photograph images of parties to be called. The SV floppy 146 is inserted in the telephone set through an insertion port 147.

Figure 9:
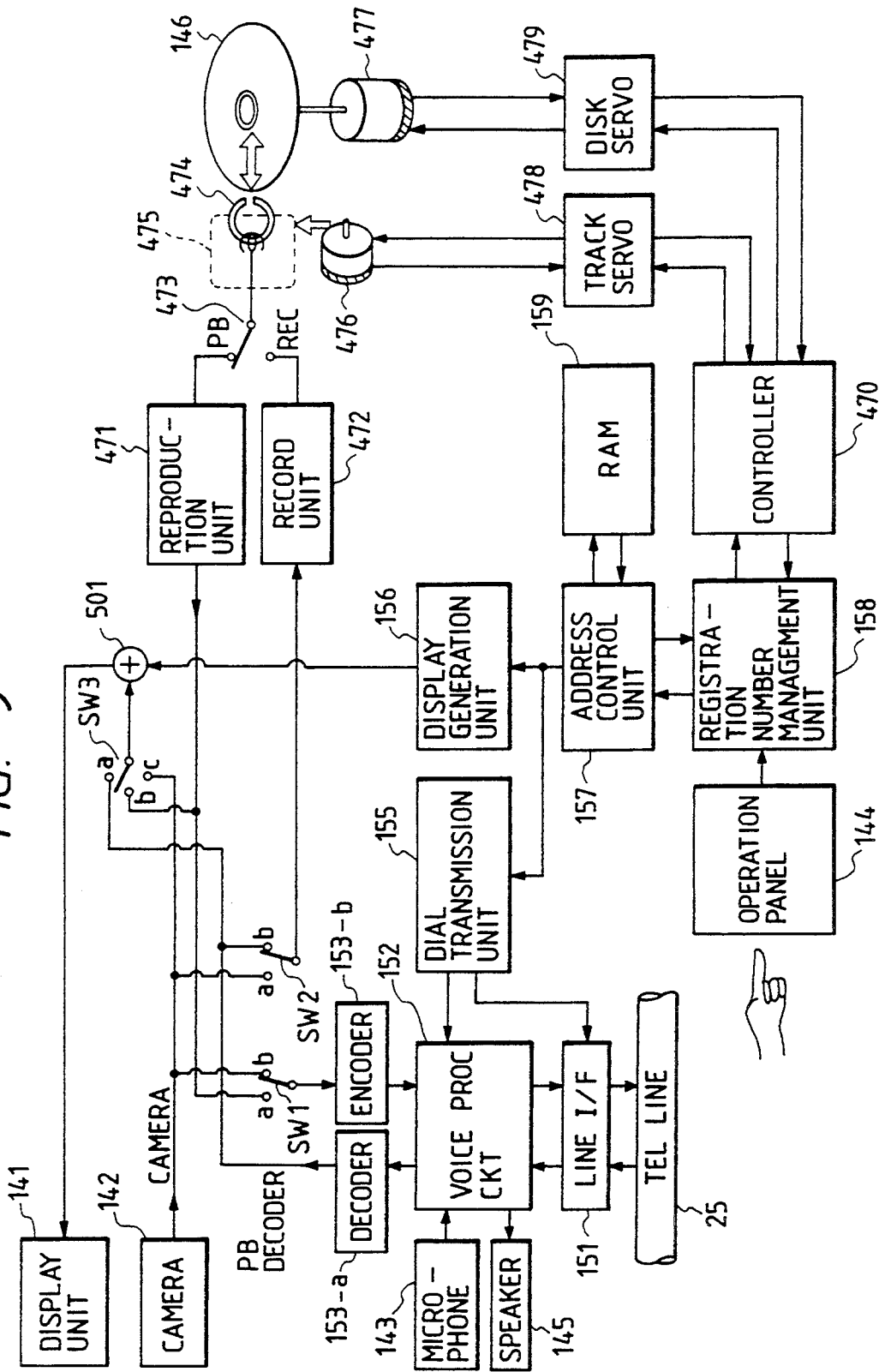
FIG. 9 is a schematic block diagram showing the arrangement of the telephone set according to the third embodiment of the present invention.

FIG. 9 is a schematic block diagram showing the arrangement of the TV telephone set according to the embodiment shown in FIG. 8. The same reference numerals in FIG. 9 denote the same parts as in FIG. 8, and a detailed description thereof will be omitted.

Upon depression of the select button 148 on the operation panel 144, a controller 470 causes a track servo 478 and a disk servo 479 to rotate the floppy 146, and reads out image data stored in the floppy. The image data is displayed on the display unit 141 through a reproduction unit 471 and a switch SW3. When the image of a desired party is displayed like in the above embodiment, a registration number of the party is input, and a telephone call can be made. In this case, the control processing by the controller 470 is performed in the same manner as in the flow chart shown in FIG. 7.

Figure 10:
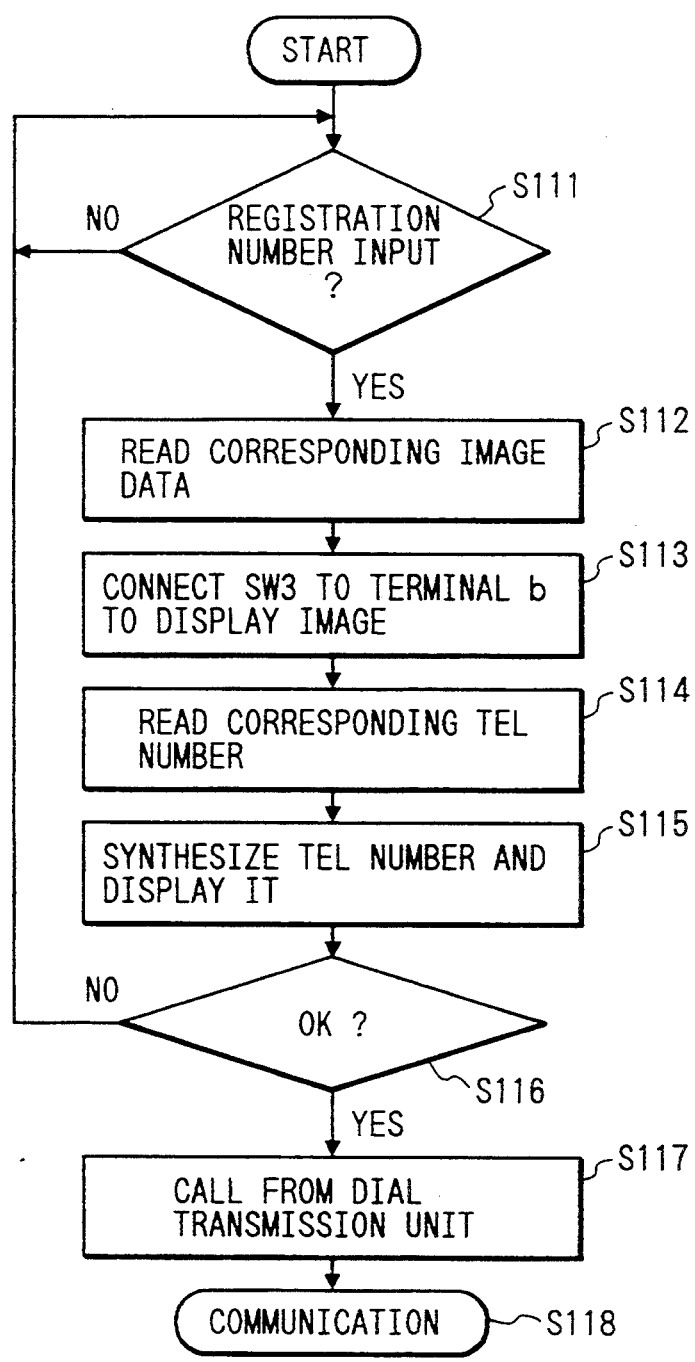
FIG. 10 is a flow chart showing registration number calling processing in the telephone set according to the third embodiment of the present invention.

Another method of performing a display will be described below with reference to FIG. 9, and the flow chart shown in FIG. 10. If it is determined in step S111 that a registration number is input from the operation panel 144, the input number is input to a registration number management unit 158, which manages and stores telephone numbers and image data in units of registration numbers. In step S112, the controller 470 reads out image data of an image corresponding to the input registration number as still image data from a desired track of the SV floppy 146 by a head 474 by controlling the track servo 478. The head 474 is arranged in a head feed mechanism 475, and is driven by a motor 476 under the control of the track servo 478. The SV floppy 146 is driven by a motor 477 under the control of the disk servo 479.

The head 474 is connected to a record/reproduction switch 473. In a reproduction mode, the head 474 supplies a reproduction signal to the reproduction unit 471. In a record mode, the head 474 writes data in the floppy 146 on the basis of a signal input from a record unit 472. Data to be recorded is switched by a switch SW2. More specifically, one of an image from the camera 142 and an output from a decoder 153-a of the still image TV telephone set can be selected by the switch SW2.

On the other hand, reproduced image data is supplied to the display unit 141 through an adder 501 by connecting the switch SW3 to a terminal b (step S113). In step S114, a corresponding telephone number stored in a RAM 159 is read out by an address control unit 157. In step S115, the readout telephone number is synthesized with image data by the adder 501 through a display generation unit 156, and synthesized data can be displayed. At this time, as an image to be displayed on the display unit 141, an image signal from either of the camera 142 or the decoder 153-a is selected by the switch SW3 in addition to a reproduction signal from the reproduction unit 471. The switching operations of these switches SW1 to SW3 are made under the instruction from the controller 470.

The flow then advances to step S116, and when a message indicating that a telephone call is to be made to the displayed party is issued from the operation panel 144, the flow advances to step S117. In step S117, a telephone call is made to the party through a dial transmission unit 155 and a line I/F (interface) 151.

On the other hand, a reproduction signal from the floppy 146 is selected by connecting the switch SW1 to a terminal b, and is then converted into a communication format of a TV telephone set by an encoder 153-b. The converted signal can be output onto a telephone line 25 through the voice processing circuit 152 and the line I/F 151. In the connection with the telephone line, a telephone number stored in correspondence with a registration number is read out from the memory element (RAM) 159 using the address control unit 157, and the dial transmission unit 155 controls the line I/F 151, thereby setting a speech communication state.

The dial transmission unit 155 has, as its detailed function, a function of designating a telephone number using dual tones used in, e.g., a push-button telephone set (pushphone). In this case, dual tones can be sent from the dial transmission unit 155 to the voice processing circuit 152.

In the third embodiment, the image memory has been described as an SV, but may comprise a tape type recording device such as an 8-mm video or a DAT, which can record addresses in units of tracks. Telephone numbers and the like may be stored in the image memory.

<Fourth Embodiment>

The fourth embodiment of the present invention will be described below with reference to FIGS. 11 and 12.

Figure 11:
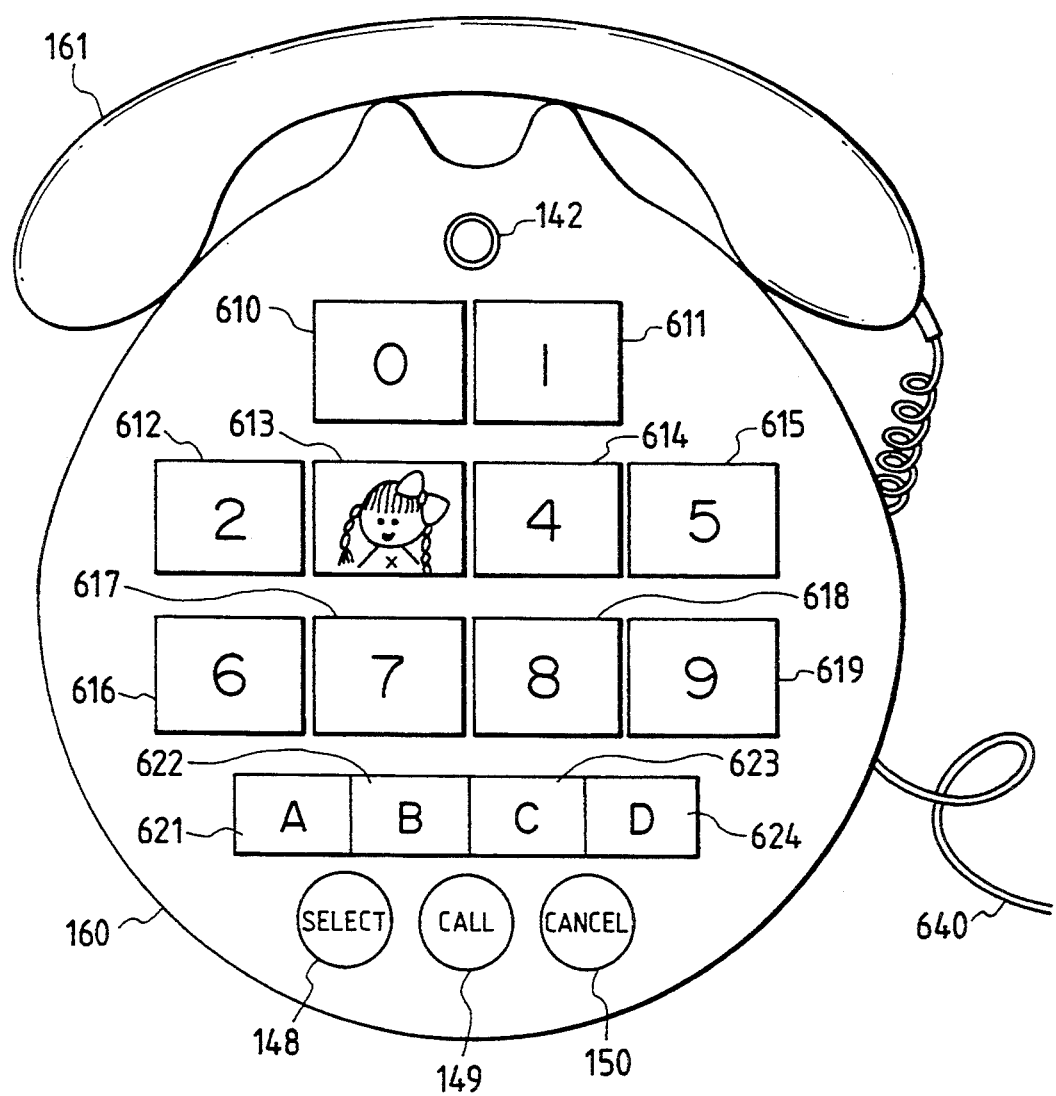
FIG. 11 is a schematic view showing the outer appearance of a telephone set according to the fourth embodiment of the present invention.

FIG. 11 shows the outer appearance of a pushphone type telephone set 160 according to the fourth embodiment of the present invention. Portions corresponding to "0" to "9" of dial buttons of the pushphone main body comprise very small display units (e.g., LCDs). FIG. 11 illustrates a state wherein image data of a party called by a normal calling operation is displayed during dialing for the purpose of confirmation.

These dial keys may correspond to registration keys, and images of parties registered in correspondence with the registration keys may be displayed on the display units (keys). Upon depression of a key corresponding to a desired person, a telephone call can be made to the displayed person. One of the contents of memories D1 to DN (FIG. 12) is called by a memory control unit 803, and a telephone number is set like in the third embodiment through a telephone number generation unit 805, thus setting a speech communication state.

The telephone set shown in FIG. 11 has a camera 142 for photographing an operator, and outputting an image signal, and auxiliary keys 621 to 624. For example, when 10 registered parties are displayed in correspondence with 10 dial keys, if the currently displayed 10 registered parties do not include a party to be called, the next page can be designated using the auxiliary keys so as to search a desired person.

Figure 12:
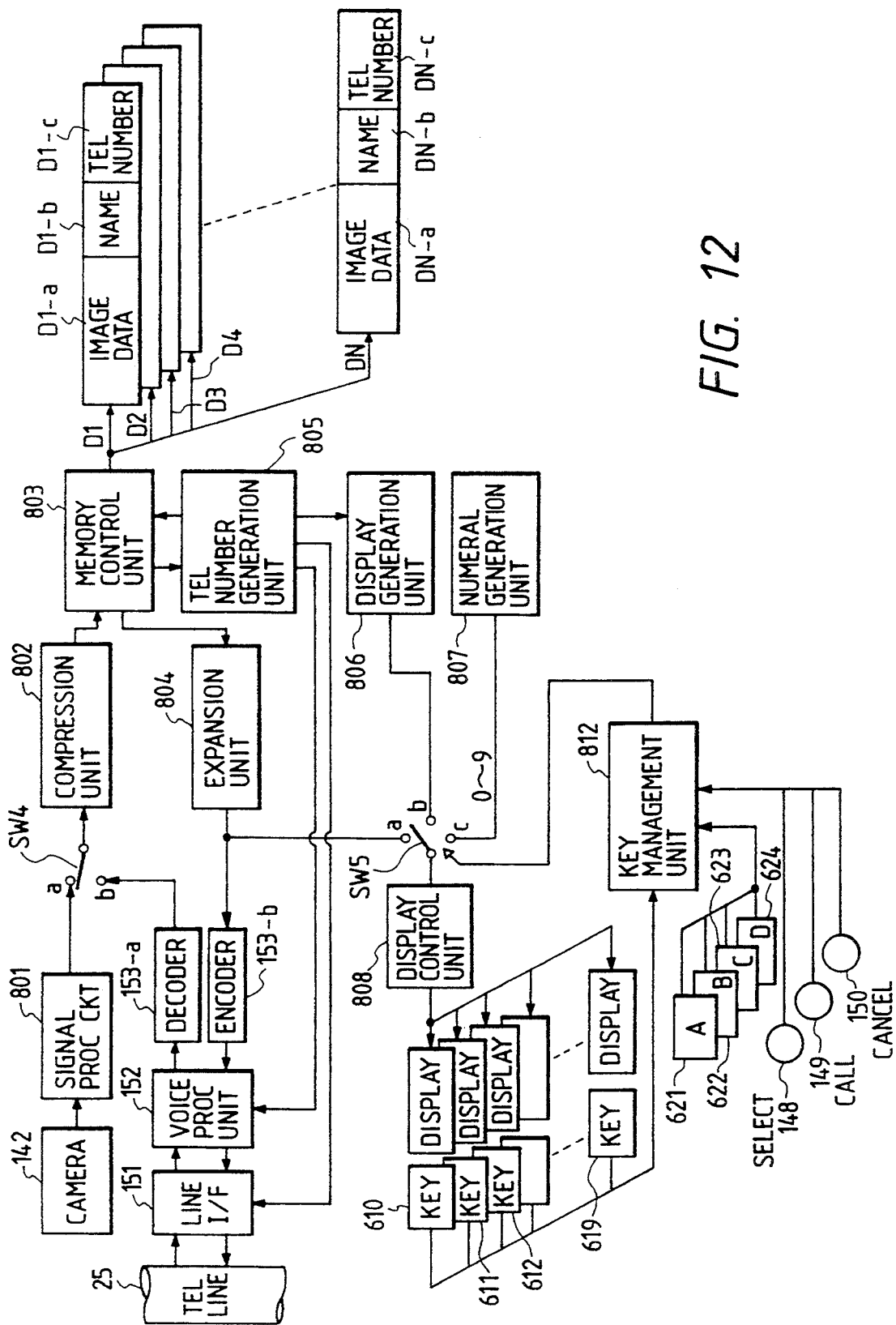
FIG. 12 is a schematic block diagram showing the arrangement of the telephone set according to the fourth embodiment of the present invention.

FIG. 12 is a schematic block diagram showing the arrangement of the telephone set. Image data from the camera 142 is input to and compressed by a compression unit 802 through a signal processing circuit 801 when a switch SW4 is connected to a terminal a. The compressed image data is stored in one of image memories D1-a to DN-a by the memory control circuit 803. When the switch SW4 is connected to the terminal b side, image data received through a telephone line 25 can be compressed, and stored in one of the image memories D1-a to DN-a. Telephone numbers corresponding to these image data are stored in memories D1-c to DN-c, and names of parties are stored in D1-b to DN-b.

Image data stored in these image memories is read out in correspondence with a telephone number. The read-out image data is expanded by an expansion unit 804. When a switch SW5 is connected to a terminal a, the expanded image data is supplied to a very small display of a dial button corresponding to the telephone number, and is displayed thereon. The expanded image data can be transferred as a TV telephone signal through an encoder 153-b, a voice processing circuit, and a circuit I/F 151.

In this manner, since a function of sending image data onto a telephone line is provided, if a distant station comprises such a telephone set, image data corresponding to the telephone number of the distant station can be registered using image data sent from the distant station.

Furthermore, when the switch SW5 is connected to a terminal b or c, other selected data can be displayed on the very small displays corresponding to the dial keys. For example, when the switch SW5 is connected to the terminal b, name data read out from the memories D1-b to DN-b may be displayed on the dial portions. When the switch SWW5 is connected to the terminal c, numerals "0" to "9" may be displayed like in a normal telephone set.

Figure 13:
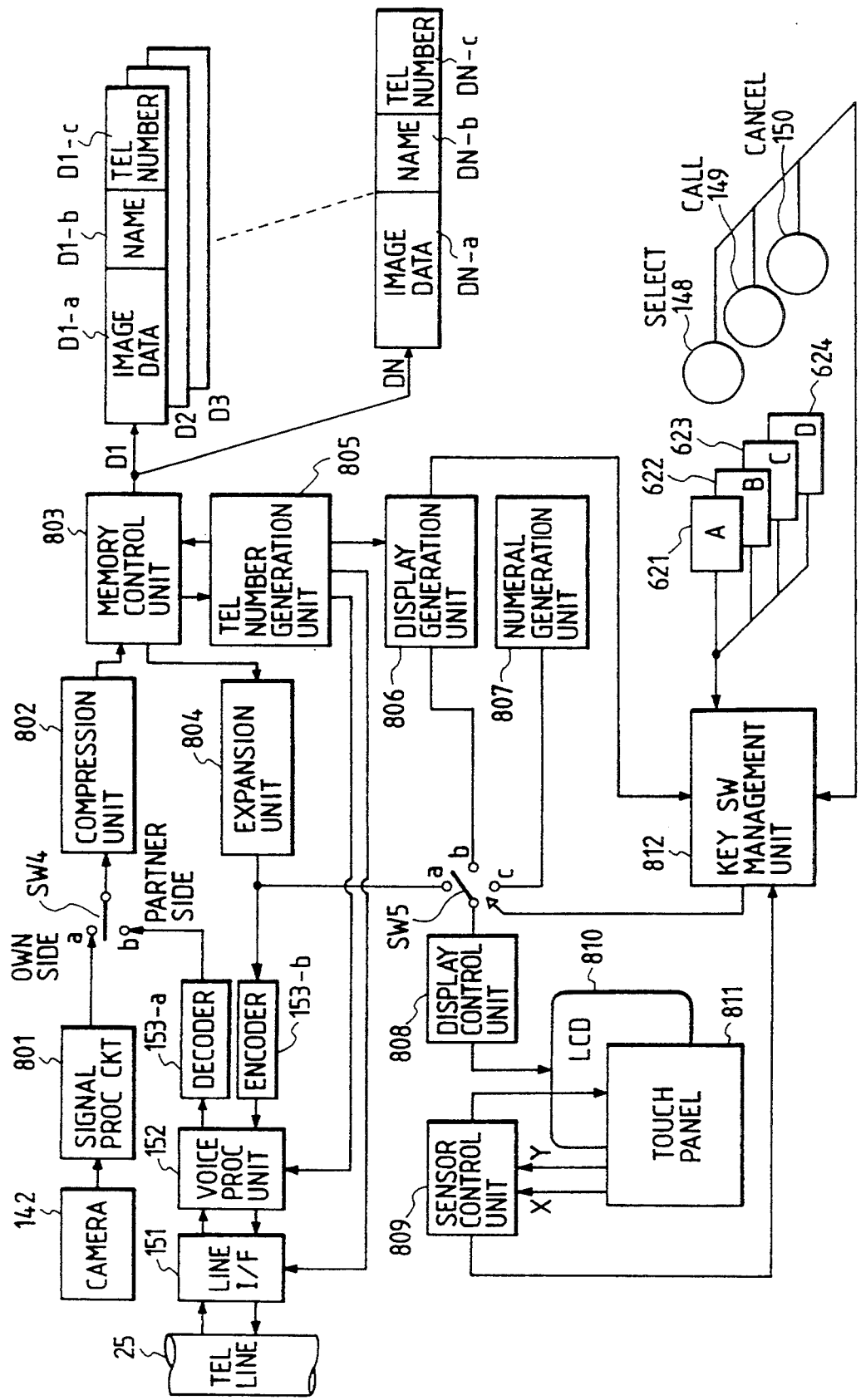
FIG. 13 is a schematic block diagram showing a modification of the arrangement of the telephone set according to the fourth embodiment of the present invention.

FIG. 13 is a schematic block diagram showing an arrangement when the dial buttons and the display units of the telephone set of the fourth embodiment are respectively constituted by a touch panel and an LCD. The same reference numerals in FIG. 13 denote the same parts as in FIG. 12, and a detailed description thereof will be omitted.

Figure 14:
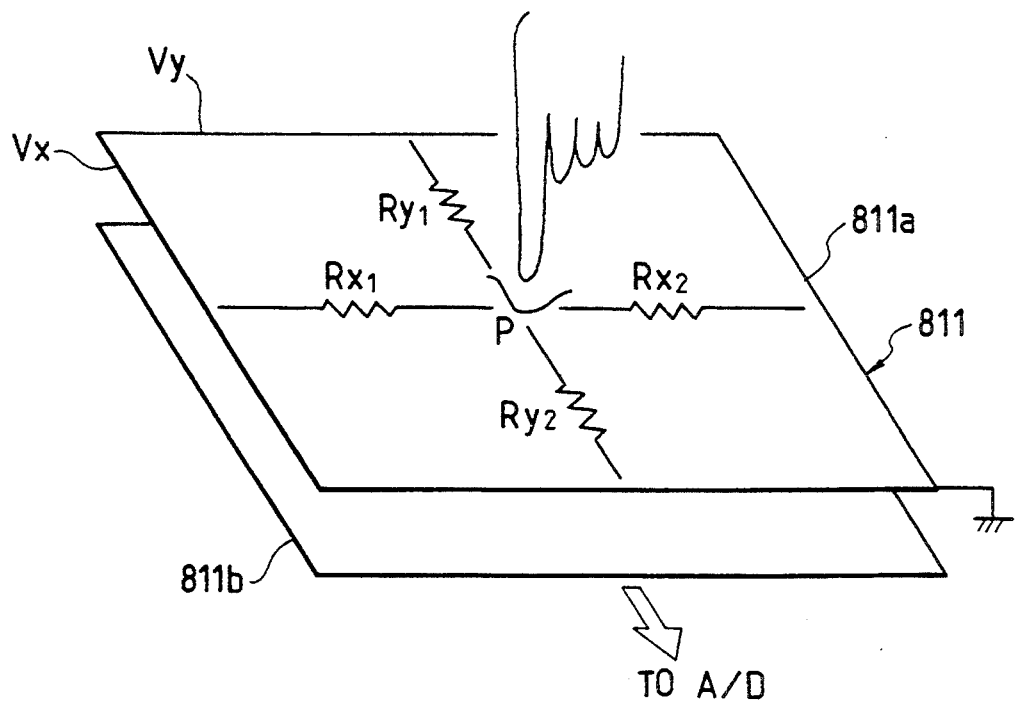
FIG. 14 is a perspective view showing an arrangement of a touch panel according to the fourth embodiment of the present invention.
Figure 15:
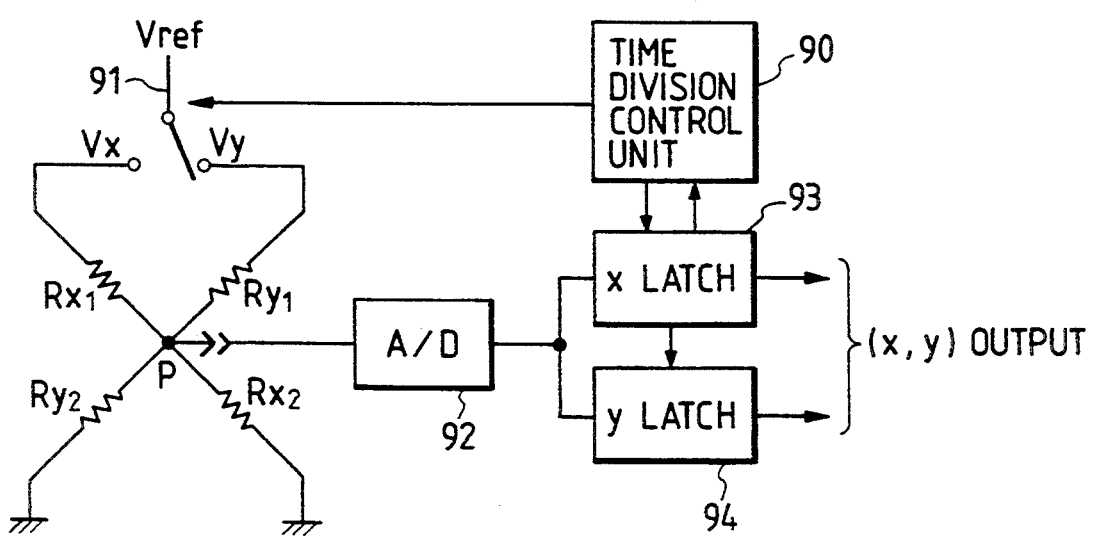
FIG. 15 is a block diagram showing the arrangement of an x-y coordinate detection circuit in the touch panel according to the fourth embodiment of the present invention.

A display unit 810 comprises, e.g., a liquid crystal display. The display unit 810 divides a single screen into a plurality of areas (corresponding to dial positions) under the control of a display control unit 808, and displays dial numbers, images, and the like, as shown in, e.g., FIG. 11. A transparent touch panel 811 has an arrangement as shown in FIGS. 14 and 15. When the touch panel 811 is depressed, the depressed position is recognized by a sensor control unit 809. In this manner, it is determined that a dial button corresponding to the depressed position is depressed, and a calling operation of a telephone number by, e.g., a pushphone is performed.

FIG. 14 shows the arrangement of the touch panel 811. The touch panel 811 comprises a resistor plate 811a and a detection plate 811b. When a point P is depressed, a resistor network is formed in the x- and y-axis directions to have the point P as a coordinate intersection, and resistances in the x- and y-axis directions at that time are as shown in FIG. 14. Voltage values obtained by voltage division with these resistances are detected by the detection plate 811b, and the coordinate position of the point P is obtained on the basis of the voltages.

FIG. 15 is a block diagram showing an arrangement of a coordinate value detection circuit.

A time division control unit 90 alternately switches a switch 91. With this switching operation, a reference voltage is alternately applied to the resistors corresponding to the x- and y-axes of the point P, and voltage-divided voltages are output from the point P. The voltages are converted into digital signals by an A/D converter 92. In this case, the x-coordinate is latched by an x latch 93, and the y-coordinate is latched by a y latch 94. The latched coordinate values are output to the sensor control unit 809, and are converted into key data. The key data is supplied to a key switch management unit 812, and processing corresponding to the depressed key is executed.

<Fifth Embodiment (FIGS. 16 & 17)>

The fifth embodiment of the present invention will be described below with reference to FIGS. 16 and 17. A telephone set of this embodiment has the same outer appearance as that shown in FIG. 8, and a difference from the telephone set shown in FIG. 8 is that the telephone set of this embodiment has an automatic answering telephone function. The arrangement of this telephone set is substantially the same as that shown in FIG. 9. An SV floppy 146 for storing image data stores absence-recorded voice data together with received image data. Auxiliary keys A to D are used as function keys for, e.g., reproducing absence-recorded data.

Figure 16:
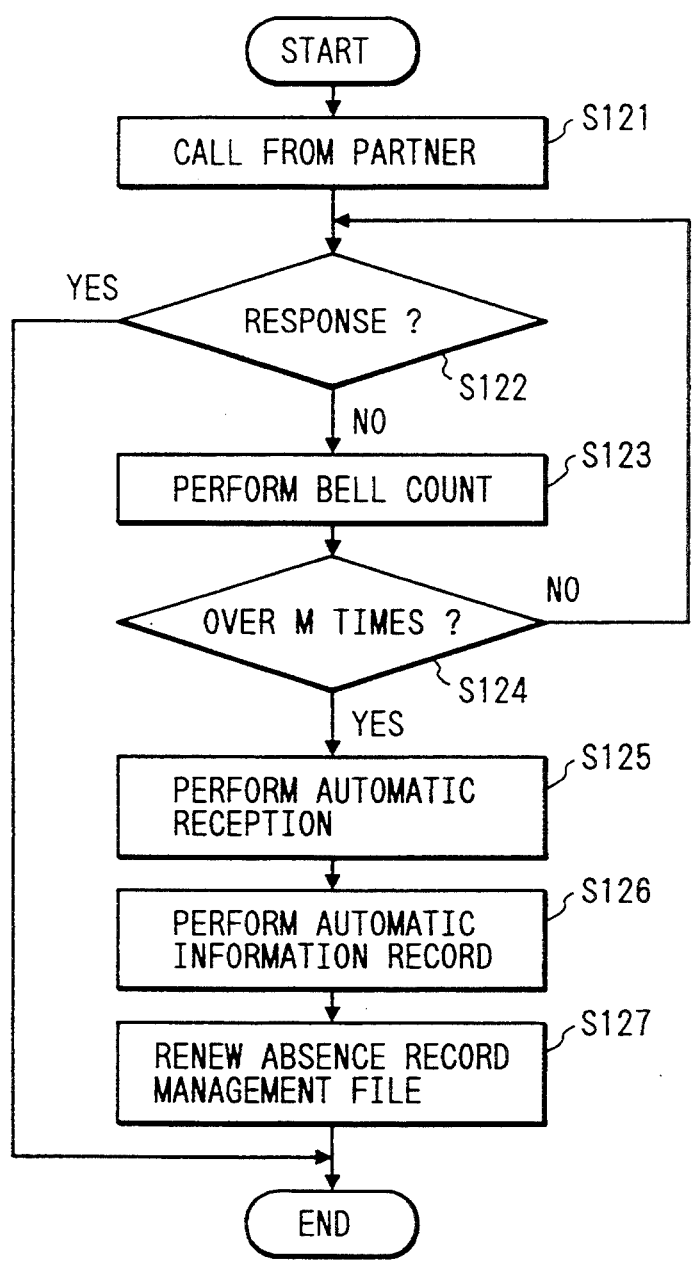
FIG. 16 is a flow chart for explaining an automatic answering telephone function according to the fifth embodiment of the present invention.

FIG. 16 is a flow chart showing an automatic answering operation in the telephone set of the fifth embodiment. If a call from a partner is detected in step S121, the flow advances to step S122 to check if a response operation is performed. When an operation key on an operation panel 144 is depressed, and a speech communication through a speaker 145 and a microphone 143 is enabled, a normal speech communication is performed. However, if no response is made, the flow advances to step S123, and the number of ringing tones (bell tones) is counted. It is checked in step S124 if the number of ringing tones is equal to or larger than a predetermined value (M). If NO in step S124, the flow returns to step S122. On the other hand, if YES in step S124, the flow advances to step S125. In step S125, a message indicating that a called party is absent is transmitted to a calling party, and automatic reception is started. In the automatic reception mode, a signal from a telephone line 25 is decoded into an image signal and a voice signal through a line I/F 151, a voice processing circuit 152, and a decoder 153-a. The decoded data are recorded on the SV floppy 146 by a recording head 474 through a record unit 472 (step S126).

The flow then advances to step S127, and an absence record management file is generated and managed in the telephone set. Every time automatic reception and information recording are performed as described above, the management file is renewed. According to the still video standards, voice information can be recorded for several seconds to several tens of seconds per track as well as image information. Thus, image information and voice information can be absence-recorded by a single recording medium (floppy) using the SV floppy.

Figure 17:
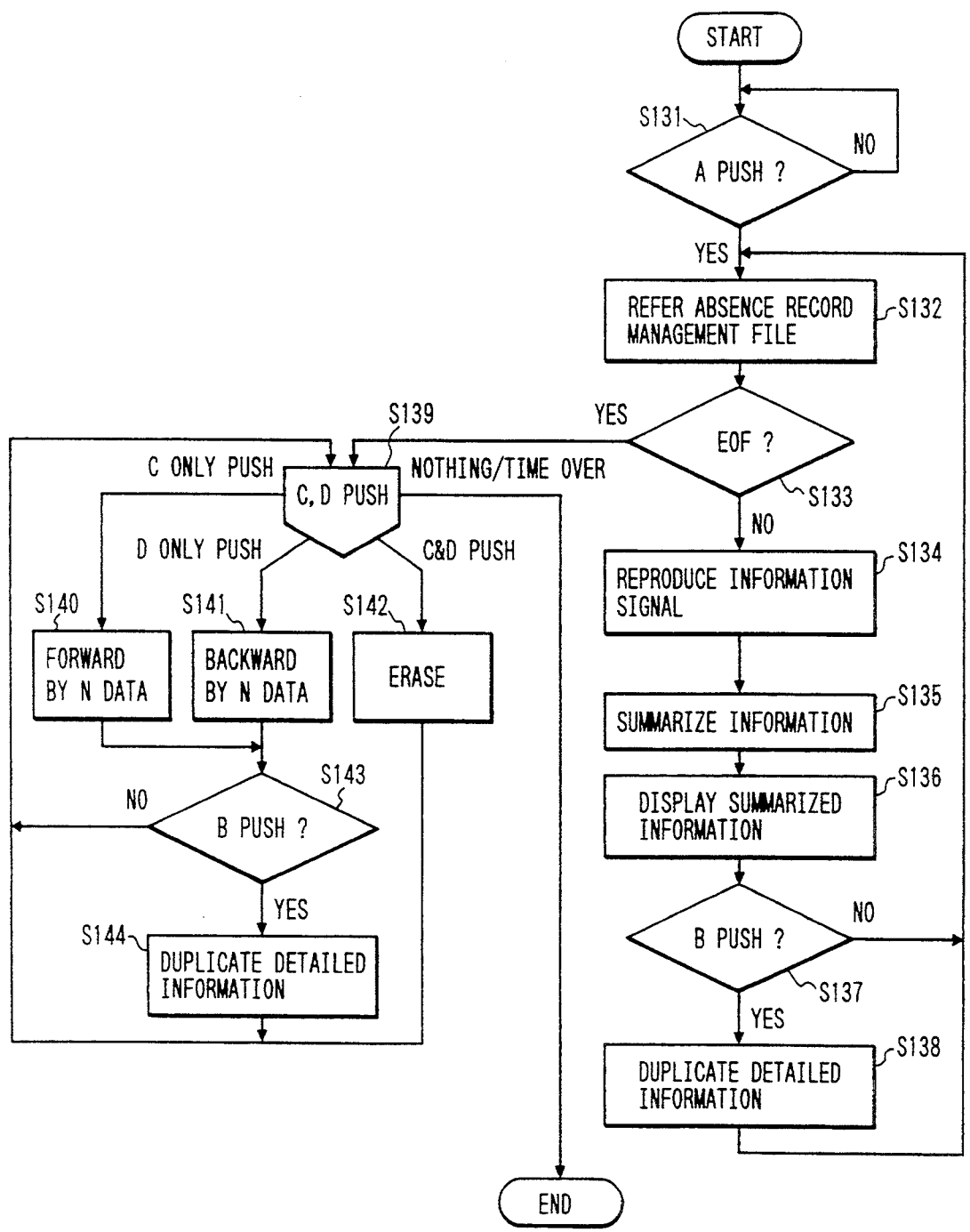
FIG. 17 is a flow chart for explaining read processing of recorded information in the automatic answering telephone function according to the fifth embodiment of the present invention.

FIG. 17 is a flow chart showing processing for reproducing absence-recorded data. When the auxiliary key A is depressed in step S131, the flow advances to step S132 to refer to the absence record management file. The end of the file is checked in step S133. If NO in step S133, the flow advances to step 134, and information of a case is reproduced from the beginning of the absence record management file. The flow then advances to step S135, and the reproduced information is summarized. In step S136, the summarized information is displayed on a display unit 141.

When the auxiliary key B is depressed in step S137, the flow advances to step S138. In step S138, voice information and image information as detailed information of the absence-recorded information, a telephone number of a calling party, and the like are displayed on the display unit 141, and are reproduced from the speaker 145. When the key B is not depressed within a predetermined period of time, the flow returns to step S132 to refer to the absence record management file, thereby reading out the next file.

If the last file is detected in step S133, the flow advances to step S139 to wait for an instruction from the auxiliary keys C and D. When only the key C is depressed, the flow advances to step S140. In step S140, the absence record files are searched forward by the number of times of depressions (N) of the key C, and the corresponding file is read out and displayed in the same manner as in steps S134 to S136. When only the key D is depressed, the flow advances from step S139 to step S141. In step S141, the absence record files are searched backward by the number of times of depressions (N) of the key D, and the corresponding file is read out and displayed in the same manner as in steps S134 to S136. When the key C is depressed k times and the key D is depressed m times, N is given by $|k-m|=N$. If $k \geq m$, the flow advances to step S140; if $k < m$, the flow advances to step S141.

In step S143, depression of the key B is waited like in step S137. If the key B is depressed within a predetermined period of time, the flow advances to step S144, and detailed information of the file is reproduced and displayed like in step S138. The flow then returns to step S139.

In this manner, the telephone set according to the fifth embodiment can also be used as an automatic answering telephone set, and stored image information and voice information can be easily reproduced.

<Sixth Embodiment (FIGS. 18 to 20)>

Figure 18:
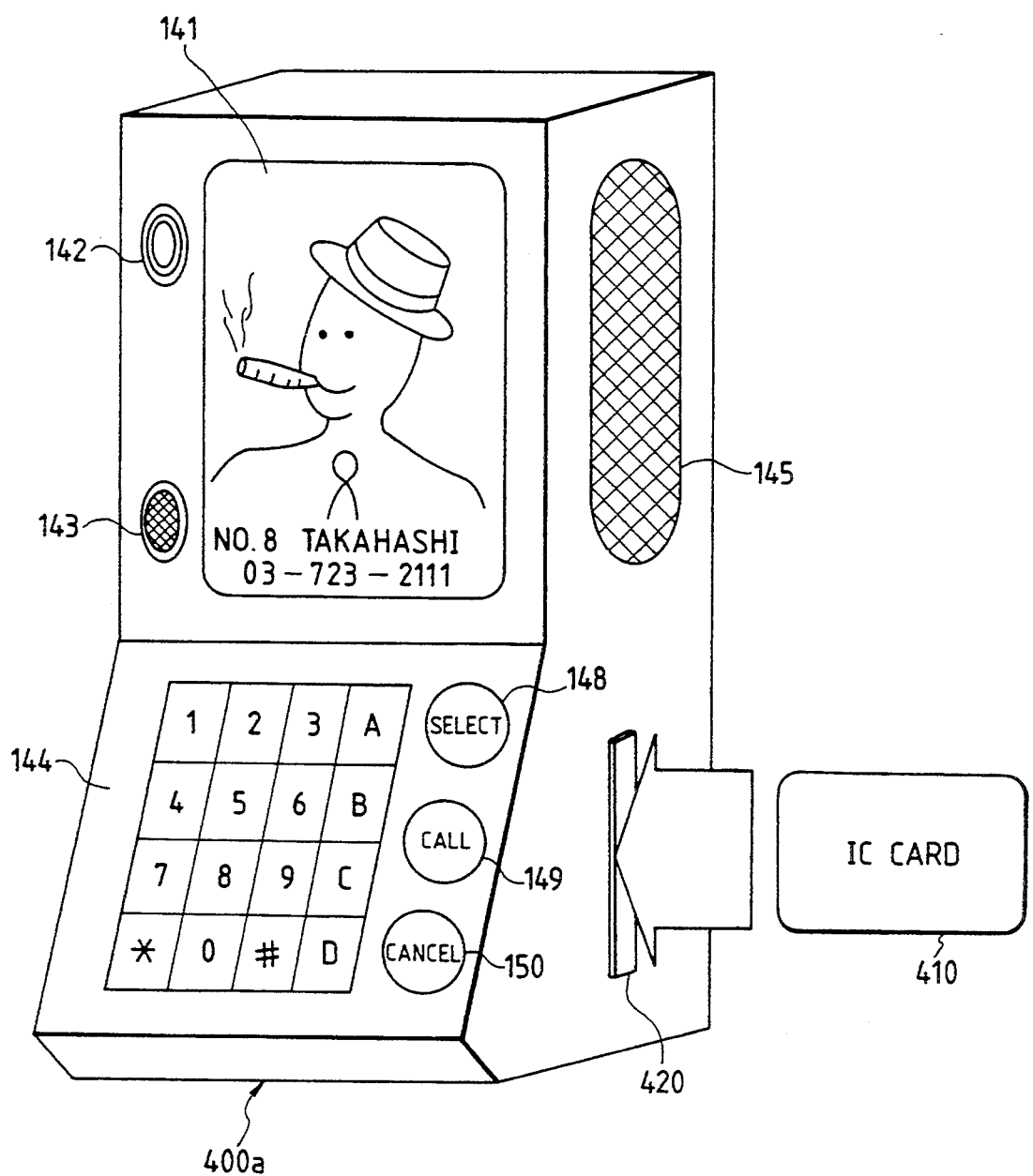
FIG. 18 is a perspective view showing the outer appearance of a telephone set using a card memory according to the sixth embodiment of the present invention.
Figure 19:
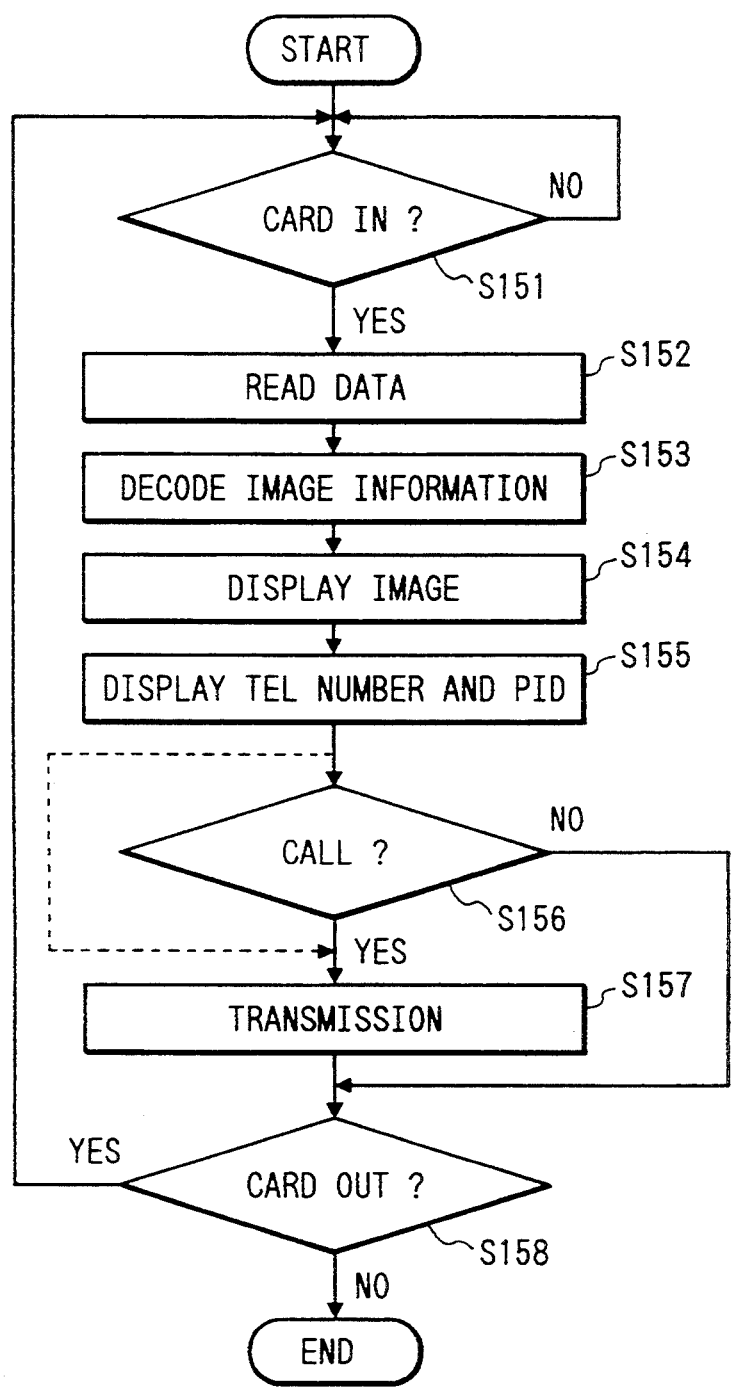
FIG. 19 is a flow chart showing calling processing in the telephone set using the card memory according to the sixth embodiment of the present invention.
Figure 20:
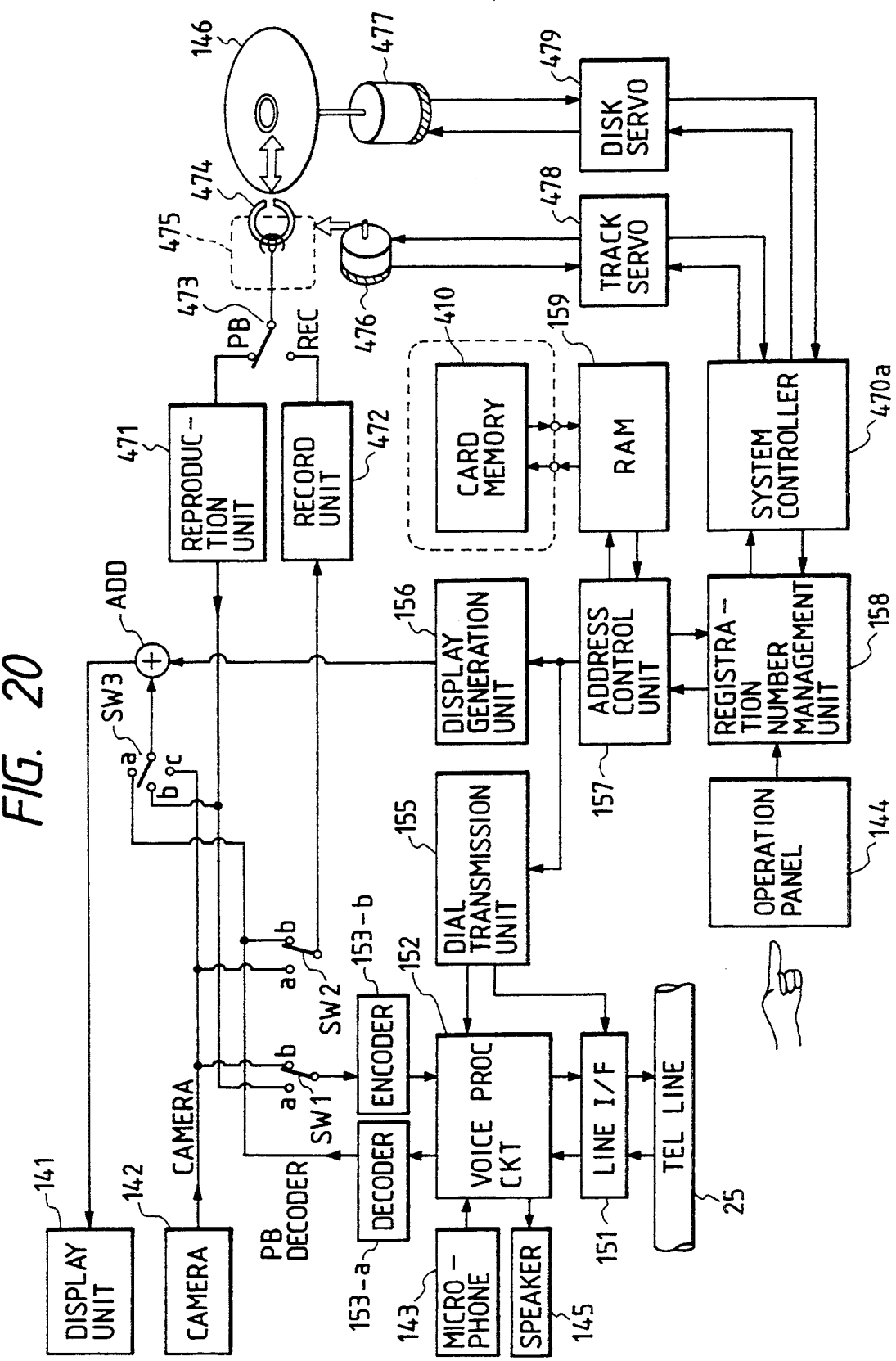
FIG. 20 is a schematic block diagram showing the arrangement of the telephone set using the card memory according to the sixth embodiment of the present invention.
Figure 21:
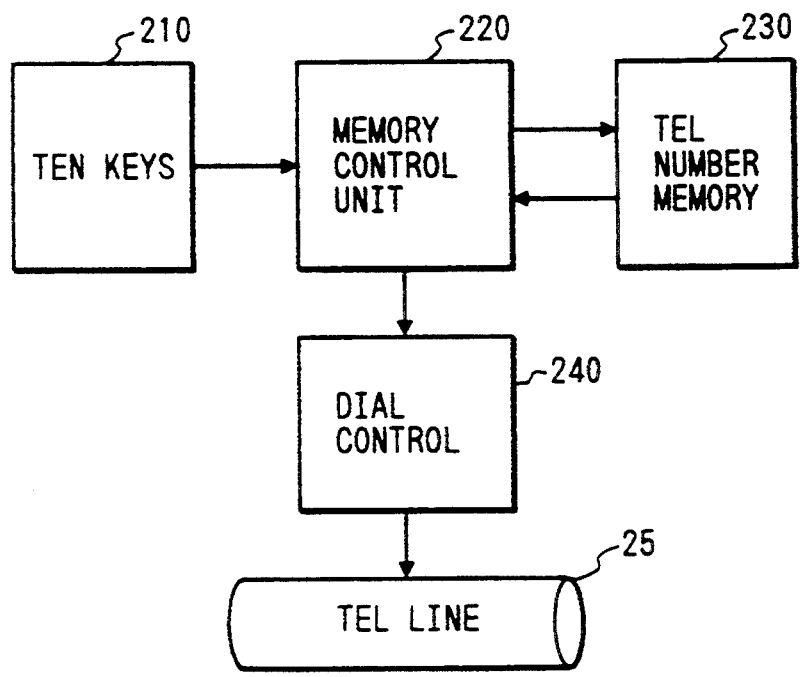
FIG. 21 is a schematic block diagram showing the arrangement of a conventional telephone set.

FIG. 18 shows the outer appearance of a telephone set according to the sixth embodiment of the present invention, and FIG. 20 is a schematic block diagram showing the arrangement of the telephone set. The same reference numerals in FIG. 20 denote parts common to those in FIG. 9, and a detailed description thereof will be omitted.

An IC card (card memory) 410 stores image information, a telephone number, and a personal identification ID code. An operation using the card memory 410 will be described below with reference to the flow chart shown in FIG. 19. When the card 410 is inserted in step S151, the flow advances to step S152 to read data from the card 410. The read data is stored in a RAM 159. In step S153, image information is decoded, and in step S154, the decoded image is displayed on a display unit 141. At this time, as shown in FIG. 18, in addition to the image information, a telephone number of a given party, a personal identification code (personal ID: PID), and the like are sequentially displayed on the display unit 141 to overlap each other (step S155).

If a call button 149 is depressed in step S156, the flow advances to step S157, and a calling operation is performed to the party currently displayed on the display unit 141 through a dial transmission unit 155 and a line I/F 151. If the card 410 is removed in step S158, the flow returns to step S151 to wait for another insertion of the card 410.

Alternatively, another sequence may be employed. For example, an automatic calling operation may be started in response to card insertion without executing step S156 (sequence indicated by a broken line in FIG. 19).

As described above, according to the present invention, since, e.g., a face photograph of a given party to be called is displayed, a speech path can be connected after an operator confirms the party to be called. A communication to a wrong, unintended party, and a dialing error of a telephone number of a party to be called can be prevented.

The preferred embodiments of the present invention have been described. However, the present invention is not limited to the above-described embodiments, and various changes and modifications may be made within the scope of the claims.

What is claimed is:

1. A multi-media communication apparatus for transmitting an image signal and a voice signal through a communication line, comprising:
    registration means for registering image information received from a distant station, and a selection signal for a telephone number of the distant station received from the distant station in correspondence with each other, said registration means further storing name information associated with the distant station;
    display means for displaying the image information or name information registered in said registration means;
    designation means for designating the image information or name information displayed on said display means to designate a telephone number of a distant station to be called;
    selection signal output means for outputting the selection signal for the designated telephone number; and
    selection means for selecting either one of the image information and name information,
    wherein said display means displays the information selected by said selection means.

2. An apparatus according to claim 1, wherein said designation means designates an image, touched by an operator, from a plurality of images displayed on said display means as a telephone number to be called.

3. An apparatus according to claim 1, wherein said registration means comprises a registration start switch for instructing start of registration of a received image, and a registration end switch for instructing end of the registration, said registration start and end switches comprising touch sensors.

4. A communication apparatus comprising:

storage means for storing a telephone number, name information and image information of a distant station, the name and image information corresponding to the telephone number;

key input means for normally displaying numerals as ten keys, and generating a call to a distant station upon being instructed using one of the ten keys;

registration means for registering a telephone number to each of said key input means;

display means for reading out the image information or the name information corresponding to the registered telephone number from said storage means, and displaying the readout information on said key input means in place of the ten key display;

communication means for, when one of said key input means is instructed, generating a call based on the telephone number registered to said instructed key input means; and selection means for selecting either one of the name information and the image information, wherein said display means displays the information selected by said selection means.

5. An apparatus according to claim 4, wherein said storage means receives and stores the image information sent from an apparatus at the distant station.

6. A multi-media communication apparatus for transmitting an image signal and a voice signal through a communication line, comprising:

registration means for registering image information associated with a distant station, and a selection signal for a telephone number of the distant station in correspondence with each other, said registration means further storing name information associated with the distant station;

display means for displaying the image information or the name information registered in said registration means;

designation means for designating the image information or the name information displayed on said display means to designate a telephone number of a distant station to be called;

selection signal output means for outputting the selection signal for the designated telephone number; and selection means for selecting either one of the image information and the name information, wherein said display means displays the information selected by said selection means.

* * * * *

UNITED STATES PATENT AND TRADEMARK OFFICE
CERTIFICATE OF CORRECTION

PATENT NO. : 5,414,457
DATED : May 9, 1995
INVENTOR(S) : SHUICHI KADOWAKI, ET AL.

It is certified that error appears in the above-identified patent and that said Letters Patent is hereby corrected as shown below:

ON TITLE PAGE

In [56] References Cited, under FOREIGN PATENT DOCUMENTS:

--0379354  1/1990  European Pat. Off.-- should be inserted; "0106318  4/1984  Germany" should read --0106318  4/1984  European Pat. Off.--; "2158250  6/1990  Japan" should read --2-158250  6/1990  Japan--; "0191648  7/1991  Japan" should read --0191648  8/1991  Japan--.

COLUMN 5

Line 54, "Signal" should read --signal--.

Signed and Sealed this

Twelfth Day of December, 1995

Attest:

BRUCE LEHMAN

*Attesting Officer*     Commissioner of Patents and Trademarks